(12) United States Patent
Wilford

(10) Patent No.: US 6,212,183 B1
(45) Date of Patent: *Apr. 3, 2001

(54) MULTIPLE PARALLEL PACKET ROUTING LOOKUP

(75) Inventor: Bruce A. Wilford, Los Altos, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/917,654

(22) Filed: Aug. 22, 1997

(51) Int. Cl.[7] .................................................. H04L 12/28
(52) U.S. Cl. ........................................... 370/392; 370/383
(58) Field of Search ..................................... 370/392, 393, 370/394, 396, 397, 398, 399, 400

(56) References Cited

U.S. PATENT DOCUMENTS

| Re. 33,900 | 4/1992 | Howson . |
|---|---|---|
| 4,131,767 | 12/1978 | Weinstein . |

(List continued on next page.)

FOREIGN PATENT DOCUMENTS

| 0 384 758 A2 | 8/1990 | (EP) . |
|---|---|---|
| 0 431 751 A1 | 6/1991 | (EP) . |
| 0 567 217 A2 | 10/1993 | (EP) . |
| WO93/07569 | 4/1993 | (WO) . |
| WO93/07692 | 4/1993 | (WO) . |
| WO94/01828 | 1/1994 | (WO) . |
| WO95/20850 | 8/1995 | (WO) . |
| WO 97/23508 | 7/1997 | (WO) . |
| WO 98/03473 | 1/1998 | (WO) . |
| WO 98/58950 | 12/1998 | (WO) . |

OTHER PUBLICATIONS

William Stallings, Data and Computer Communications, pp. 329–333, Prentice Hall, Upper Saddle River, New Jersey 07458.

Allen, M., "Novell IPX Over Various WAN Media (IPXWAN)," Network Working Group, RFC 1551, Dec. 1993, pp. 1–22.

(List continued on next page.)

Primary Examiner—Douglas W. Olms
Assistant Examiner—Ricardo M. Pizarro
(74) Attorney, Agent, or Firm—Swernofsky Law Group

(57) ABSTRACT

The invention provides a method and system for routing information lookup for packets using a routing protocol such as IP. Routing information which has been determined responsive to the packet header, which includes a destination address, a source address, and an input interface for the packet. Routing lookup is performed in response to at least one set of selected routing information, using a lookup table which includes tags both for the routing information and for a bitmask length (thus indicating the generality or scope of the routing information for the routing lookup). The lookup table is structured so that addresses having the most common bitmask length are addressed first, but that more specific addresses are still considered when they are present. It has been discovered that most internet addresses can be found by reference to 24-bit or 21-bit IP addresses, after which 16-bit, 12-bit, and finally 32-bit IP addresses are considered. Lookup flags indicate when a relatively uncommon but more specific 32-bit IP address match is available. A memory controller pipelines the lookup requests to a hash table memory, flushes superfluous requests when a lookup result is found, and handles cases relating to 32-bit IP address matches.

4 Claims, 2 Drawing Sheets

U.S. PATENT DOCUMENTS

| | | |
|---|---|---|
| 4,161,719 | 7/1979 | Parikh et al. . |
| 4,316,284 | 2/1982 | Howson . |
| 4,397,020 | 8/1983 | Howson . |
| 4,419,728 | 12/1983 | Larson . |
| 4,424,565 | 1/1984 | Larson . |
| 4,437,087 | 3/1984 | Petr . |
| 4,438,511 | 3/1984 | Baran . |
| 4,439,763 | 3/1984 | Limb . |
| 4,445,213 | 4/1984 | Baugh et al. . |
| 4,446,555 | 5/1984 | Devault et al. . |
| 4,456,957 | 6/1984 | Schieltz . |
| 4,464,658 | 8/1984 | Thelen . |
| 4,499,576 | 2/1985 | Fraser . |
| 4,506,358 | 3/1985 | Montgomery . |
| 4,507,760 | 3/1985 | Fraser . |
| 4,532,626 | 7/1985 | Flores et al. . |
| 4,644,532 | 2/1987 | George et al. . |
| 4,646,287 | 2/1987 | Larson et al. . |
| 4,677,423 | 6/1987 | Benvenuto et al. . |
| 4,679,189 | 7/1987 | Olson et al. . |
| 4,679,227 | 7/1987 | Hughes-Hartogs . |
| 4,723,267 | 2/1988 | Jones et al. . |
| 4,731,816 | 3/1988 | Hughes-Hartogs . |
| 4,750,136 | 6/1988 | Arpin et al. . |
| 4,757,495 | 7/1988 | Decker et al. . |
| 4,763,191 | 8/1988 | Gordon et al. . |
| 4,769,810 | 9/1988 | Eckberg, Jr. et al. . |
| 4,769,811 | 9/1988 | Eckberg, Jr. et al. . |
| 4,771,425 | 9/1988 | Baran et al. . |
| 4,819,228 | 4/1989 | Baran et al. . |
| 4,827,411 | 5/1989 | Arrowood et al. . |
| 4,833,706 | 5/1989 | Hughes-Hartogs . |
| 4,835,737 | 5/1989 | Herrig et al. . |
| 4,879,551 | 11/1989 | Georgiou et al. . |
| 4,893,306 | 1/1990 | Chao et al. . |
| 4,903,261 | 2/1990 | Baran et al. . |
| 4,922,486 | 5/1990 | Lidinsky et al. . |
| 4,933,937 | 6/1990 | Konishi . |
| 4,960,310 | 10/1990 | Cushing . |
| 4,962,497 | 10/1990 | Ferenc et al. . |
| 4,962,532 | 10/1990 | Kasirai et al. . |
| 4,965,767 | 10/1990 | Kinoshita ................. 365/49 |
| 4,965,772 | 10/1990 | Daniel et al. . |
| 4,970,678 | 11/1990 | Sladowski et al. . |
| 4,979,118 | 12/1990 | Kheradpir .............. 364/436 |
| 4,980,897 | 12/1990 | Decker et al. . |
| 4,991,169 | 2/1991 | Davis et al. . |
| 5,003,595 | 3/1991 | Collins et al. . |
| 5,016,265 | 5/1991 | Hahne et al. . |
| 5,020,058 | 5/1991 | Holden et al. . |
| 5,033,076 | 7/1991 | Jones et al. . |
| 5,034,919 | 7/1991 | Sasai ...................... 365/49 |
| 5,054,034 | 10/1991 | Hughes-Hartogs . |
| 5,059,925 | 10/1991 | Weisbloom . |
| 5,072,449 | 12/1991 | Enns et al. . |
| 5,088,032 | 2/1992 | Bosack . |
| 5,095,480 | 3/1992 | Fenner . |
| 5,115,431 | 5/1992 | Williams et al. . |
| 5,128,945 | 7/1992 | Enns et al. . |
| 5,136,580 | 8/1992 | Videlock et al. . |
| 5,166,930 | 11/1992 | Braff et al. . |
| 5,199,049 | 3/1993 | Wilson . |
| 5,206,886 | 4/1993 | Bingham . |
| 5,208,811 | 5/1993 | Kashio et al. . |
| 5,212,686 | 5/1993 | Joy et al. . |
| 5,224,099 | 6/1993 | Corbalis et al. . |
| 5,226,120 | 7/1993 | Brown et al. . |
| 5,228,062 | 7/1993 | Bingham . |
| 5,229,994 | 7/1993 | Balzano et al. . |
| 5,237,564 | 8/1993 | Lespagnol et al. . |
| 5,241,682 | 8/1993 | Bryant et al. . |
| 5,243,342 | 9/1993 | Kattemalalavadi et al. . |
| 5,243,596 | 9/1993 | Port et al. . |
| 5,247,516 | 9/1993 | Bernstein et al. . |
| 5,249,178 | 9/1993 | Kurano et al. . |
| 5,253,251 | 10/1993 | Aramaki . |
| 5,255,291 | 10/1993 | Holden et al. . |
| 5,260,933 | 11/1993 | Rouse . |
| 5,260,978 | 11/1993 | Fleischer et al. . |
| 5,268,592 | 12/1993 | Bellamy et al. . |
| 5,268,900 | 12/1993 | Hluchyj et al. . |
| 5,271,004 | 12/1993 | Proctor et al. . |
| 5,274,631 | 12/1993 | Bhardwaj . |
| 5,274,635 | 12/1993 | Rahman et al. . |
| 5,274,643 | 12/1993 | Fisk . |
| 5,280,470 | 1/1994 | Buhrke et al. . |
| 5,280,480 | 1/1994 | Pitt et al. . |
| 5,280,500 | 1/1994 | Mazzola et al. . |
| 5,283,783 | 2/1994 | Nguyen et al. . |
| 5,287,103 | 2/1994 | Kasprzyk et al. . |
| 5,287,453 | 2/1994 | Roberts . |
| 5,291,482 | 3/1994 | McHarg et al. . |
| 5,305,311 | 4/1994 | Lyles . |
| 5,307,343 | 4/1994 | Bostica et al. . |
| 5,309,437 | 5/1994 | Perlman et al. ................. 730/85.13 |
| 5,311,509 | 5/1994 | Heddes et al. . |
| 5,313,454 | 5/1994 | Bustini et al. . |
| 5,313,582 | 5/1994 | Hendel et al. . |
| 5,317,562 | 5/1994 | Nardin et al. . |
| 5,319,644 | 6/1994 | Liang . |
| 5,327,421 | 7/1994 | Hiller et al. . |
| 5,331,637 | 7/1994 | Francis et al. . |
| 5,345,445 | 9/1994 | Hiller et al. . |
| 5,345,446 | 9/1994 | Hiller et al. . |
| 5,353,283 | * 10/1994 | Tsuchiya ............................. 370/392 |
| 5,359,592 | 10/1994 | Corbalis et al. . |
| 5,361,250 | 11/1994 | Nguyen et al. . |
| 5,361,256 | 11/1994 | Doeringer et al. . |
| 5,361,259 | 11/1994 | Hunt et al. . |
| 5,365,524 | 11/1994 | Hiller et al. . |
| 5,367,517 | 11/1994 | Cidon et al. . |
| 5,371,852 | 12/1994 | Attanasio et al. . |
| 5,386,567 | 1/1995 | Lien et al. . |
| 5,390,170 | 2/1995 | Sawant et al. . |
| 5,390,175 | 2/1995 | Hiller et al. . |
| 5,394,394 | 2/1995 | Crowther et al. . |
| 5,394,402 | 2/1995 | Ross . |
| 5,400,325 | 3/1995 | Chatwani et al. . |
| 5,408,469 | 4/1995 | Opher et al. . |
| 5,416,842 | 5/1995 | Aziz . |
| 5,422,880 | 6/1995 | Heitkamp et al. . |
| 5,422,882 | 6/1995 | Hillet et al. . |
| 5,423,002 | 6/1995 | Hart . |
| 5,426,636 | 6/1995 | Hiller et al. . |
| 5,428,607 | 6/1995 | Hiller et al. . |
| 5,430,715 | 7/1995 | Corbalis et al. . |
| 5,430,729 | 7/1995 | Rahnema . |
| 5,442,457 | 8/1995 | Najafi . |
| 5,442,630 | 8/1995 | Gagliardi et al. . |
| 5,452,297 | 9/1995 | Hiller et al. . |
| 5,473,599 | 12/1995 | Li et al. . |
| 5,473,607 | 12/1995 | Hausman et al. . |
| 5,477,541 | * 12/1995 | White ................................. 370/428 |
| 5,485,455 | 1/1996 | Dobbins et al. . |
| 5,490,140 | 2/1996 | Abensour et al. . |
| 5,490,258 | 2/1996 | Fenner . |
| 5,491,687 | 2/1996 | Christensen et al. . |
| 5,491,804 | 2/1996 | Heath et al. . |
| 5,497,368 | 3/1996 | Reijnierse et al. . |
| 5,504,747 | 4/1996 | Sweasey . |
| 5,509,006 | 4/1996 | Wilford et al. . |

| | | |
|---|---|---|
| 5,517,494 | 5/1996 | Green . |
| 5,519,704 | 5/1996 | Farinacci et al. . |
| 5,526,489 | 6/1996 | Nilakantan et al. . |
| 5,530,963 | 6/1996 | Moore et al. . |
| 5,535,195 | 7/1996 | Lee . |
| 5,535,338 * | 7/1996 | Krause .................................. 370/420 |
| 5,539,734 | 7/1996 | Burwell et al. . |
| 5,541,911 | 7/1996 | Nilakantan et al. . |
| 5,546,370 | 8/1996 | Ishikawa . |
| 5,555,244 | 9/1996 | Gupta et al. . |
| 5,561,669 | 10/1996 | Lenney et al. . |
| 5,566,170 | 10/1996 | Bakke ..................................... 370/60 |
| 5,583,862 | 12/1996 | Callon . |
| 5,592,470 | 1/1997 | Rudrapatna et al. . |
| 5,596,574 * | 1/1997 | Perlman .............................. 370/389 |
| 5,598,581 | 1/1997 | Daines et al. . |
| 5,600,798 | 2/1997 | Chenrukuri et al. . |
| 5,602,770 | 2/1997 | Ohira ..................................... 365/49 |
| 5,604,868 | 2/1997 | Komine et al. . |
| 5,608,726 | 3/1997 | Virgile . |
| 5,617,417 | 4/1997 | Sathe et al. . |
| 5,617,421 | 4/1997 | Chin et al. . |
| 5,630,125 | 5/1997 | Zellweger . |
| 5,631,908 | 5/1997 | Saxe . |
| 5,632,021 | 5/1997 | Jennings et al. . |
| 5,634,010 | 5/1997 | Ciscon et al. . |
| 5,638,359 | 6/1997 | Peltola et al. . |
| 5,644,718 | 7/1997 | Belove et al. . |
| 5,651,002 * | 7/1997 | Van Seters .......................... 370/392 |
| 5,659,684 | 8/1997 | Giovannoni et al. . |
| 5,666,353 | 9/1997 | Klausmeier et al. . |
| 5,673,265 | 9/1997 | Gupta et al. . |
| 5,678,006 | 10/1997 | Valizadeh et al. . |
| 5,680,116 | 10/1997 | Hashimoto et al. . |
| 5,684,797 | 11/1997 | Aznar et al. . |
| 5,684,954 | 11/1997 | Kaiserwerth ...................... 395/200.2 |
| 5,687,324 | 11/1997 | Green et al. . |
| 5,689,506 | 11/1997 | Chiussi et al. . |
| 5,694,390 | 12/1997 | Yamato et al. . |
| 5,724,351 | 3/1998 | Chao et al. . |
| 5,740,097 | 4/1998 | Satoh ..................................... 365/49 |
| 5,748,186 | 5/1998 | Raman . |
| 5,748,617 | 5/1998 | McLain, Jr. . |
| 5,751,971 * | 5/1998 | Dobbins .......................... 395/200.68 |
| 5,754,547 * | 5/1998 | Nakazawa ............................ 370/401 |
| 5,802,054 | 9/1998 | Bellenger . |
| 5,802,065 | 9/1998 | Ogawa ................................. 370/469 |
| 5,835,710 | 11/1998 | Nagami et al. . |
| 5,841,874 | 11/1998 | Kempke ................................ 380/50 |
| 5,854,903 | 12/1998 | Morrison et al. . |
| 5,856,981 | 1/1999 | Voelker . |
| 5,872,783 | 2/1999 | Chin ..................................... 370/392 |
| 5,892,924 | 4/1999 | Lyon ............................... 395/200.75 |
| 5,898,686 * | 4/1999 | Virgile ................................. 370/381 |
| 5,903,559 | 5/1999 | Acharya et al. . |
| 5,909,440 | 6/1999 | Ferguson ............................. 370/389 |
| 5,909,686 | 6/1999 | Muller ................................. 707/104 |
| 5,917,820 | 6/1999 | Rekhter ............................... 370/392 |
| 5,920,566 | 7/1999 | Hendel ................................ 370/401 |
| 5,938,736 | 8/1999 | Muller ................................. 709/243 |
| 5,949,786 | 9/1999 | Bellenger ............................ 370/401 |

OTHER PUBLICATIONS

Becker, D., "3c589.c: A 3c589 EtherLink3 ethernet driver for linux," becker@CESDIS.gsfc.nasa.gov, May 3, 1994, pp. 1–13.

Chowdhury, et al., "Alternative Bandwidth Allocation Algorithms for Packet Video in ATM Networks," INFOCOM 1992, pp. 1061–1068.

Doeringer, W., "Routing on Longest–Matching Prefixes," IEEE/ACM Transactions in Networking, vol. 4, No. 1, Feb. 1996, pp. 86–97.

Esaki, et al., "Datagram Delivery in an ATM–internet, "2334b IEICE Transactions on Communications, Mar. 1994, No. 3, Tokyo, Japan.

Pei, et al., "Putting Routing Tables in Silicon," IEEE Network Magazine, Jan. 1992, pp. 42–50.

Perkins, D., "Requirements for an Internet Standard Point–to–Point Protocol," Network Working Group, RFC 1547, Dec. 1993, pp. 1–19.

Simpson, W., "The Point–to–Point Protocol (PPP)," Network Working Group, RFC 1548, Dec. 1993, pp. 1–53.

Tsuchiya, P.F., "A Search Algorithm for Table Entries with Non–Contiguous Wildcarding," Abstract, Bellcore.

Zhang, et al., "Rate–Controlled Static–Priority Queueing," INFOCOM 1993, pp. 227–236.

IBM Corporation, "Method and Apparatus for the Statistical Multiplexing of Voice, Data and Image Signal," IBM Technical Disclosure Bulletin, No. 6, Nov. 1992, pp. 409–411.

* cited by examiner

MULTIPLE PARALLEL PACKET ROUTING LOOKUP

BACKGROUND OF THE INVENTION

1. Field of the Invention

The invention relates to packet switching.

2. Related Art

In a packet-switched network, a "router" is a device which receives packets on one or more input interfaces and which outputs those packets on one of a plurality of output interfaces, so as to move those packets within the network from a source device to a destination device. Each packet includes header information which indicates the destination device (and other information), and the router includes routing information which associates an output interface with information about the destination device (possibly with other information). The router can also perform other operations on packets, such as rewriting the packets according to their routing protocol or to reencapsulate the packets from a first routing protocol to a second routing protocol. It is advantageous for routers to operate as quickly as possible, so that as many packets as possible can be switched in a unit time.

One operation performed by routers is routing lookup, that is, accessing routing information in response to the header information from the packet. For example, the router can determine an output interface on which to output the packet in response to a destination address specified by the packet header. In some routing protocols such as IP, an entire set of destination addresses can be associated with a single output interface, so that the operation of routing lookup can be responsive to routing information of differing lengths.

A first problem which has arisen in the art is that storing and retrieving routing information can be both complex and slow, due to the number of differing ways in which the destination address or other packet header information can be associated with that routing information. For example, methods by which the router might perform routing lookup for longer sets of routing lookup information can be inefficient for shorter sets of routing lookup information, and methods by which the router might perform routing lookup for shorter sets of routing lookup information can be inefficient for longer sets of routing lookup information.

A second problem which has arisen in the art is that header information associated with routing lookup has been seen to follow identifiable patterns, particularly for IP addresses used in the internet. Among those identifiable patterns are that 21-bit and 24-bit destination address headers are relatively common, while 32-bit destination addresses and 8-bit destination address headers are relatively rare. Thus, methods by which the router might perform routing lookup should be efficient for lookup of middle-length destination addresses without being inefficient for lookup of relatively longer or shorter destination addresses.

Some known routers, such as those described in U.S. application Ser. No. 08/655,429, "Network Flow Switching and Flow Data Export", filed May 28, 1996, in the name of inventors Darren Kerr and Barry Bruins, and assigned to Cisco Systems, Inc., and U.S. application Ser. No. 08/771,438, having the same title, filed Dec. 20, 1996, in the name of the same inventors, assigned to the same assignee, can perform routing lookup for differing length destination addresses, by successively performing routing lookup for successive bytes of the destination address. Thus, each byte of the destination address provides further information from which specific information for routing the packet can be addressed. While this method achieves the goal of being relatively flexible with regard to the length of the destination address required for routing lookup, it can take many clock cycles to perform routing lookup, and is therefore not as relatively quick as desired. Moreover, while this method is relatively efficient for relatively shorter length destination addresses, it becomes increasingly inefficient as the lengths of destination addresses become relatively longer.

Accordingly, it would be desirable to provide a method and system for performing routing lookup, which is responsive to a plurality of different sets of routing lookup information. This advantage is achieved in an embodiment of the invention in which a plurality of sets of routing lookup information are queued for lookup in an external memory, particularly where a plurality of sets of routing lookup information are distinguished both by packet routing information and to the length of that header information.

SUMMARY OF THE INVENTION

The invention provides a method and system for routing information lookup for packets using a routing protocol such as IP. Routing information is determined responsive to the packet header, which in a preferred embodiment includes a destination address, a source address, and an input interface for the packet. Routing lookup is performed in response to at least one set of selected routing information, using a lookup table which includes tags both for the routing information and for a bitmask length (thus indicating the generality or scope of the routing information for the routing lookup).

In a preferred embodiment, the lookup table is structured so that addresses having the most common bitmask length are addressed first, but that more specific addresses are still considered when they are present. It has been discovered that most internet addresses can be found by reference to 24-bit or 21-bit IP addresses, after which 16-bit, 12-bit, and finally 32-bit IP addresses are considered. Lookup flags indicate when a relatively uncommon but more specific 32-bit IP address match is available. A memory controller pipelines the lookup requests to a hash table memory, flushes superfluous requests when a lookup result is found, and handles cases relating to 32-bit IP address matches.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using general purpose processors or special purpose processors or other circuits adapted to particular process steps and data structures described herein, and that implementation of the process steps and data structures described herein would not require undue experimentation or further invention.

Inventions described herein can be used in conjunction with inventions described in the following applications:

application Ser. No. 08/918,505, filed the same day, Express Mail Mailing No. EM 337222825 US, in the name of the same inventor, titled "Multiprotocol Packet Recognition and Switching", and application Ser. No. 08/918,506, filed the same day, Express Mail Mailing No. EM 571204544 US, in the name of the same inventor, titled "Enhanced Internet Packet Routing Lookup".

Each of these applications is hereby incorporated by reference as if fully set forth herein.

System for Enhanced Internet Packet Address Lookup

Figure 1:
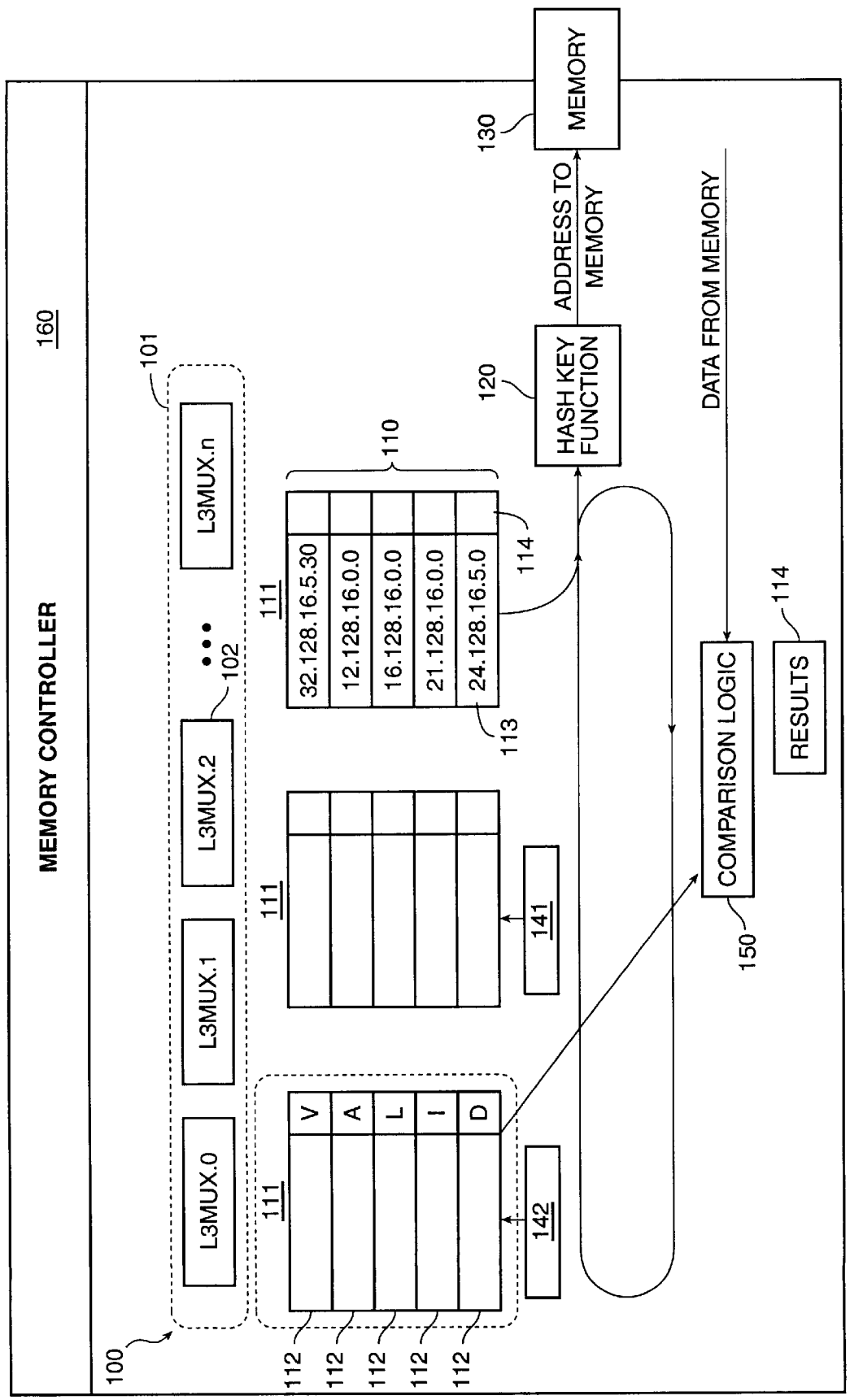
FIG. 1 shows a block diagram of a system for multiple parallel packet routing lookup.

FIG. 1 shows a block diagram of a system for multiple parallel packet routing lookup.

A system 100 includes an input port 101 for receiving and distributing a plurality of m1 words 102 of routing lookup information; in a preferred embodiment the routing lookup information comprises the plurality of m multiplexer output words 232 and the system 100 comprises the lookup memory element 131, as shown by figures in the co-pending application "Multiprotocol Packet Recognition and Switching", application Ser. No. 08/918,505.

In a preferred embodiment, the plurality of m1 words 102 includes m1 different sets of routing lookup information which include m1 different ways in which routing results for an associated packet can be determined. For a first example, where the associated packet is transmitted using an IP multicast protocol such as IGMP, the m1 words 102 can include both (s, g) and (*, g) lookup information for that packet. For a second example, where the associated packet is transmitted using an IP unicast protocol such as IGRP, the m1 words 102 can include routing lookup information for that packet responsive to both the packet address and a network bitmask length, as described in further detail in the co-pending application "Enhanced Internet Packet Routing Lookup", application Ser. No. 08/918,506.

In a preferred embodiment, m1 is about ten, so as to accommodate about ten different ways in which routing results for an associated packet can be determined. Of these, in a preferred embodiment, five are used for IP version 4, two for IP multicast (IGMP), one for TAG switching, one for IPX, and one as a spare for expansion.

The plurality of m1 words 102 are coupled to a lookup holding table 110. The lookup holding table 110 includes a plurality of k1 columns 111 and a plurality of m2 rows 112. An entry 113 is defined at the unique intersection of each column 111 and row 112.

Each of the m1 words 102 is coupled to a corresponding set of the m2 rows 112 of the lookup holding table 110. The correspondence between the m1 words 102 and the m2 rows 112 is not one-to-one; there are a greater number of the m1 words 102 than the m2 rows 112. Thus, a first one of the m2 rows 112 is coupled to all of the m1 words 102, a second one of the m2 rows 112 is coupled to some of the m1 words 102, and a last one of the m2 rows 112 is coupled to at least one of the m1 words 102.

In a preferred embodiment, m2 is about five, so as to accommodate about five simultaneous matches for a selected protocol. Since the m1 words 102 include five sets of lookup information for IP version 4, five is the expected maximum number of simultaneous matches.

Each entry 113 includes one word 102 of routing lookup information and a valid bit 114 indicating whether the word 102 in the entry 113 is meaningful. In a preferred embodiment where those words 102 can be of variable length, each entry 113 is sufficiently large to hold a largest possible word 102 of routing lookup information, with unused parts of the entry 113 being preferably set to zero.

Each entry 113 is coupled to a succeeding entry 113 in the same column 111 but in the next row 112. A bottom entry 113 in each column 111 in the last row 112 is coupled to a hashing element 120, which determines a hash value in response thereto.

The hashing element 120 is coupled to an external memory 130, which associates the hash value with a corresponding set of routing results. The information in the memory is responsive to the length field for the header information. The memory preferably includes a plurality of entries matching the header information and differing with regard to he length field. The length field preferably indicates a longest match for a destination address included in the header information. In a preferred embodiment, the external memory 130 includes a hash table with a set of entries associated with each hash value. For example, the external memory 130 can include an ordered list of entries associated with each hash value. Hash tables are known in the art of computer science.

In a preferred embodiment, hash values which are coupled to the external memory 130 are pipelined. When the external memory 130 is responding to a first hash value, the time delay is used to supply further hash values to the external memory 130 so as to take advantage of the intervening time between requesting data from the external memory 130 and receiving the requested data in response. After each entry 113 is coupled to the hashing element 120, a next entry 113 is coupled to the hashing element 120 in succession, so that a plurality of k2 entries 113 are pipelined and a similar plurality of k2 hash values are supplied in parallel to the external memory 130 and are in various stages of response.

In a preferred embodiment, k2 is at least five, so as to accommodate at least five lookup operations in parallel. It is expected that the external memory 130 takes at least about five times as long to respond to a lookup request as it takes for a single entry 113 to be processed. A leading parallel pointer 141 references a particular column 111 which has been earliest coupled to the external memory 130 for lookup. Similarly, a trailing parallel pointer 142 references a particular column 111 which has been latest coupled to the external memory 130 for lookup. The leading parallel pointer 141 and the trailing parallel pointer 142 are maintained k2 columns 111 apart.

In a preferred embodiment, k1 (the number of columns 111) is about eleven, at least k2 (five) columns 111 so as to be able to perform at least k2 lookup operations can proceed in parallel, plus one additional column 111 so as to provide time for clearing one of the columns 111 after routing lookup is complete, plus about five additional columns 111 so as to provide room for inserting new sets of routing information.

An output of the external memory 130 is coupled to a comparison element 150, which compares a result of the lookup of the hash value in the external memory 130 with the associated routing lookup information. The result of the lookup includes both a routing result and the associated routing lookup information. If the external memory 130 has more than one set of routing lookup information and routing results associated with a particular hash value, and responds with an incorrect association from the hash table, the comparison element 150 can note the difference and signal the external memory 130 to respond with a further association from the hash table.

Method of Operation

Figure 2:
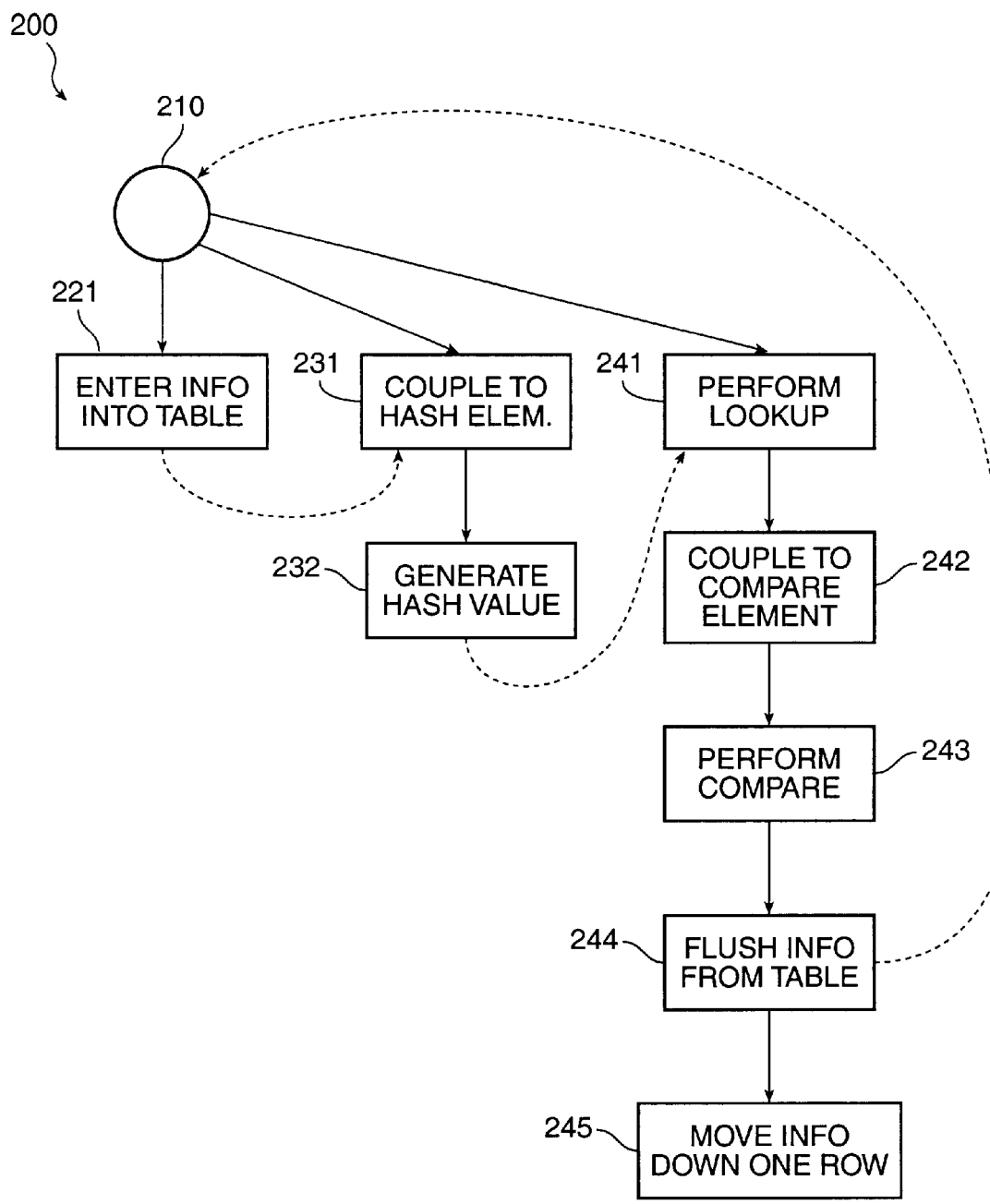
FIG. 2 shows a process flow diagram of a method of operating a system for multiple parallel packet routing lookup.

FIG. 2 shows a process flow diagram of a method of operating a system for multiple parallel packet routing lookup.

A method 200 of operating the system 100 is controlled by a memory controller 160, which controls the hashing element 120, the external memory 130, the leading parallel pointer 141, the trailing parallel pointer 142, and the comparison element 150, and other elements described herein, and includes flow points and process steps as described herein.

At a flow point 210, one or more words 102 of routing lookup information have arrived at the input port 101, and are ready for lookup.

The step 221 is performed in parallel with the steps 231 and following, which are performed in parallel with the steps 241 and following, so as to continuously perform lookup operations in parallel with the arrival of routing lookup information.

At a step 221, a column 111 of the lookup holding table 110 is selected, and the words 102 of routing lookup information are entered into the selected first column 111 of the lookup holding table 110. The column 111 is selected so as not to be between the leading parallel pointer 141 and the trailing parallel pointer 142.

In a preferred embodiment, addresses having the most common bitmask length are inserted into the lookup holding table 110 so as to be addressed first, but so that more specific addresses are still considered when they are present.

It has been discovered that most internet addresses can be found by reference to 24-bit or 21-bit IP addresses, after which 16-bit, 12-bit, and finally 32-bit IP addresses are considered. When an IP address is to be entered into the external memory 130, it is appended so as to meet one or more of these specific lengths.

When an IP address is to be searched in the external memory 130, entries having each of these specific lengths, in this specific order, are searched. Thus, a 24-bit search value is entered at the bottom entry 113 of the column 111, followed by a 21-bit search value, followed by a 16-bit search value, a 12-bit search value, and finally a 32-bit search value. When a relatively uncommon but more specific 32-bit IP address match is available, the entries for shorter search values are tagged with a "more specific value" tag to so indicate.

At a step 231, a bottom entry 113 in each column 111 between the leading parallel pointer 141 and the trailing parallel pointer 142 is coupled to the hashing element 120. The hashing element 120 generates a hash key for indexing into lookup tables in the external memory 130. The memory controller 160 transmits routing lookup information from the bottom entry 113 for each column 111 in turn to the hashing element 120, which in response generates a hash key and transmits that hash key to the external memory 130.

At a step 232, the hashing element 120 generates a hash key in response to the routing lookup information at the bottom of the selected second column 111, and transmits that hash key to the external memory 130 for the lookup operation.

At a step 241, the external memory 130 performs the lookup operation with the hash key.

In a preferred embodiment, the external memory 130 takes several (about five) clock cycles to respond with stored routing results, so the memory controller 160 pipeline processes a similar number (about five) hash values to the external memory 130 so as to pipeline process memory lookup by the external memory 130. Pipeline processing is known in the art of computer processing.

At a step 242, the external memory 130 couples a result of the lookup operation to the comparison element 150.

In the step 242, if the "more specific value" tag is set for the result of the lookup operation, the memory controller 160 records the result of the first routing lookup, flushes the search values up to the row 112 having the 32-bit search value, and retries the lookup as if the lookup operation had failed in the step 243. Thereafter, if the lookup for the 32-bit search value succeeds, the memory controller 160 uses the result of the 32-bit routing lookup; otherwise, if the lookup for the 32-bit search value fails, the memory controller 160 uses the recorded result of the first routing lookup.

At a step 243, the comparison element 150 compares the original routing lookup information with the result of the lookup operation. If the two match, the lookup operation is deemed successful, and the result of the lookup operation is deemed to include routing information for properly routing the packet. The routing information is forwarded to other devices so as to route the packet, and the method 200 continues with the step 244.

If the two do not match, the lookup operation is deemed unsuccessful so far. In a preferred embodiment, the hash table in the external memory 130 includes a set of secondary entries for the particular hash key, preferably disposed as disclosed herein in a ordered list. An address for the next entry in the list is transmitted to the external memory 130 and the method 200 repeats the lookup operation until either a successful lookup operation occurs, or there are no further secondary entries, in which case the lookup operation fails.

At a step 244, the lookup operation succeeded, and the remaining ones of the multiple entries 113 are flushed from the lookup holding table. The column 111 in which those multiple entries 113 becomes free for another set of multiple entries 113 from a packet. The method 200 continues at the flow point 210.

At a step 245, the lookup operation failed, and the remaining ones of the multiple entries 113 are each moved down one position, so that the second entry 113 becomes the bottom entry 113. If there are no further ones of the multiple entries 113 for the particular packet, routing for the packet has failed and the packet is dropped. Whether or not the packet is dropped, the method 200 continues at the flow point 210.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method, including the steps of receiving a packet header, said packet header including header information;

determining a packet treatment identifier responsive to said header information, said packet treatment identifier including a destination address; and using said packet treatment identifier to access a memory having information regarding treatment of packets, said information being responsive to a length field for said header information, said memory including a plurality of entries matching said header information and differing with regard to said length field, said entries associated with packet routing information, and wherein said length field indicates a longest match for said destination address included in said header information.

2. A method as in claim 1, wherein said destination address is a destination IP address.

3. A method as in claim 1, wherein said packet treatment identifier includes a source IP address.

4. A method as in claim 1, wherein said memory includes a plurality of entries matching said destination address and responsive to a multicast packet.

* * * * *